(12) United States Patent
Huang

(10) Patent No.: US 11,092,847 B2
(45) Date of Patent: Aug. 17, 2021

(54) BACKLIGHT MODULE AND DISPLAY DEVICE

(71) Applicant: HKC CORPORATION LIMITED, Shenzhen (CN)

(72) Inventor: Beizhou Huang, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 16/970,454

(22) PCT Filed: Jun. 27, 2018

(86) PCT No.: PCT/CN2018/093050
§ 371 (c)(1),
(2) Date: Aug. 17, 2020

(87) PCT Pub. No.: WO2019/161629
PCT Pub. Date: Aug. 29, 2019

(65) Prior Publication Data
US 2021/0116758 A1      Apr. 22, 2021

(30) Foreign Application Priority Data
Feb. 24, 2018   (CN) .......................... 201810157360.0

(51) Int. Cl.
*G02F 1/1335*     (2006.01)
*F21V 8/00*       (2006.01)
*G02F 1/13357*    (2006.01)

(52) U.S. Cl.
CPC ..... *G02F 1/133607* (2021.01); *G02B 6/0016* (2013.01); *G02F 1/133603* (2013.01); *G02F 1/133605* (2013.01); *G02F 1/133606* (2013.01)

(58) Field of Classification Search
CPC ......... G02F 1/133607; G02F 1/133606; G02B 6/0016
See application file for complete search history.

(56) References Cited

U.S. PATENT DOCUMENTS

2010/0302135 A1* 12/2010 Larson .............. G02F 1/133603
                                                        345/102
2012/0008308 A1*  1/2012 Adachi ................ G02B 6/0021
                                                        362/97.2
(Continued)

FOREIGN PATENT DOCUMENTS

CN       2391269 Y      8/2000
CN     201803317 U      4/2011
(Continued)

OTHER PUBLICATIONS

Machine translation of Wang et al., CN 107092051 A, Aug. 25, 2017 (Year: 2017).*
(Continued)

*Primary Examiner* — William N Harris
(74) *Attorney, Agent, or Firm* — Westbridge IP LLC

(57) ABSTRACT

Disclosed is a backlight module, where the backlight module includes: a backplane; a light source array disposed on the backplane and including a plurality of light source components; a diffusion plate disposed above the light source array and parallelled to the light source array, the diffusion plate being provided with at least one refraction structure, lights of the plurality of light source components being refracted by the at least one refraction structure, at least part of the at least one refraction structure corresponding to each of the plurality of light source components of the light source array. A display device including the backlight module is further provided.

19 Claims, 6 Drawing Sheets

(56) References Cited

U.S. PATENT DOCUMENTS

| | | | |
|---|---|---|---|
| 2013/0250617 A1* | 9/2013 | Ahn | G02B 6/0073 |
| | | | 362/613 |
| 2015/0124484 A1* | 5/2015 | Gu | G02F 1/1336 |
| | | | 362/613 |
| 2016/0054623 A1* | 2/2016 | Maeda | G02F 1/133603 |
| | | | 349/62 |
| 2016/0274415 A1* | 9/2016 | Gu | G02B 6/0068 |
| 2017/0248289 A1* | 8/2017 | Vasylyev | G02F 1/133603 |
| 2019/0227382 A1* | 7/2019 | Watanabe | G02B 6/0036 |
| 2020/0049876 A1* | 2/2020 | Watanabe | G02B 6/0016 |
| 2020/0049877 A1* | 2/2020 | Watanabe | G02B 6/0031 |

FOREIGN PATENT DOCUMENTS

| | | |
|---|---|---|
| CN | 102313165 A | 1/2012 |
| CN | 203784748 U | 8/2014 |
| CN | 107092051 A | 8/2017 |
| CN | 206975360 U | 2/2018 |
| JP | H1124583 A | 1/1999 |

OTHER PUBLICATIONS

Machine translation of Sugimachi et al., JPH1124583, Jan. 29, 1999 (Year: 1999).*
First Office Action in counterpart Chinese Application No. 201810157360.0, dated Jul. 29, 2019.
International Search Report in corresponding PCT Application No. PCT/CN2018/093050, dated Nov. 27, 2018.
Second Office Action in counterpart Chinese Application No. 201810157360.0, dated Mar. 17, 2020.
Written Opinion in corresponding PCT Application No. PCT/CN2018/093050, dated Nov. 27, 2018.

* cited by examiner

BACKLIGHT MODULE AND DISPLAY DEVICE

CROSS-REFERENCE TO RELATED APPLICATIONS

The present disclosure is a National Stage of International Application No. PCT/CN2018/093050, filed on Jun. 27, 2018, which claims the priority of Chinese Patent Application No. CN201810157360.0, entitled "BACKLIGHT MODULE AND DISPLAY DEVICE", filed on Feb. 24, 2018, which is hereby incorporated by reference in its entirety.

TECHNICAL FIELD

The present disclosure generally relates to the technical field of backlight display device, and more particularly relates to a backlight module and a display device.

BACKGROUND

Liquid crystal television normally includes a light source and a transparent panel for displaying image. The transparent panel itself cannot give out light, so another important component, for example, backlight source, is needed to provide light for the panel to display images. The component that provides backlight source is backlight module. Light sources of the backlight module commonly include cold cathode lamps and light emitting diodes, etc. As the light emitting diode has the advantages of low power consumption and high luminance, making that a research direction has focused on taking the light emitting diode as the backlight module of the light source in the liquid crystal display technology. There are two types of backlight module, one is direct type backlight module and the other is side view backlight module, according to the incident position of the light. The direct type backlight module locates the light source components at the back of the transparent panel of the liquid crystal television as a luminous source, the backlight can be evenly transmitted to the entire panel, therefore, the details of image are delicate and realistic. However, as the backlight module is disposed at the back of the transparent panel, the thickness of the liquid crystal television is increased. The side view backlight module locates the light source module around the edge of the liquid crystal television, and light emitted from the side view backlight module is transmitted to the central area of the panel by a light guide plate matched with the light source module. The liquid crystal television having the side view backlight module is much more light and thin. However, for the light source components of the side view backlight module is located around the edge of the panel, the image brightness at the panel edge is higher than the image brightness at the central area of the panel. Considering the display effect, most of the liquid crystal televisions use the direct type backlight modules.

Currently, the liquid crystal televisions having the direct type backlight modules mostly adopt flat diffusion plates, to spray the light source and improve the display effect. In order to reduce cost, the amount of the light sources in the backlight module may be decreased, which brings a problem that spaces between the light sources would increase, if a refraction structure is not provided to assist, the area between two light sources will be darker than the areas having the light sources due to a lack of light illuminating, thereby the display effect of the liquid crystal display panel would be badly affected, as well as the user's visual experience.

SUMMARY

The present disclosure provides a backlight module, which aims to solve the problem of that in the current backlight module, the image displayed has uneven brightness and darkness, resulting a badly display effect.

In one aspect, the exemplary embodiment of the present disclosure provides a backlight module, which includes:
a backplane;
a light source array, disposed on the backplane and including a plurality of light source components;
a diffusion plate, disposed above the light source array and parallelled to the light source array, the diffusion plate is provided with at least one refraction structure, lights of the plurality of light source components are refracted by the at least one refraction structure, and at least part of the at least one refraction structure corresponds to each of the plurality of light source components of the light source array.

In another aspect, the exemplary embodiment of the present disclosure provides another backlight module, which includes:
a backplane;
a light source array, disposed on the backplane and including a plurality of light source components, a reflective layer is provided on a surface of the backplane having the light source array; and
a diffusion plate, disposed above the light source array and parallelled to the light source array, the diffusion plate is provided with a plurality of refraction structures arranged continuously on a light-incident surface, lights of the plurality of light source components are refracted by the plurality of refraction structures, one of the plurality of refraction structures is a smooth spherical surface or a smooth ellipsoidal surface, and at least part of the plurality of refraction structures corresponds to each of the plurality of light source components of the light source array.

Another aspect, the exemplary embodiment of the present disclosure further provides a display device, which includes:
a backlight module; and
a display panel, disposed at a light-emitting side of the backlight module;
the backlight module includes:
a backplane;
a light source array, disposed on the backplane and including a plurality of light source components;
a diffusion plate, disposed above the light source array and parallelled to the light source array, the diffusion plate is provided with at least one refraction structure, lights of the plurality of light source components are refracted by the at least one refraction structure, at least part of the at least one refraction structure corresponds to each of the plurality of light source components of the light source array.

The backlight module provided by the exemplary embodiment of the present disclosure includes the light source array which is disposed on the backplane and includes a plurality of light source components; the diffusion plate disposed above the light source array and parallelled to the light source array, the portion of the diffusion plate corresponding to each of the light source components of the light source array defines the refraction structure configured to allow the emergent lights of the light source components to refract. By adopting the backlight module of the exemplary embodiment of the present disclosure, it is benefit to solve the problem of that in the current backlight module, the image displayed has uneven brightness and darkness issue due to the decreasing of light sources, the display effect of the display panel is effectively improved.

BRIEF DESCRIPTION OF THE DRAWINGS

To better illustrate the technical solutions that are reflected in various embodiments according to this disclosure or that are found in the prior art, the accompanying drawings intended for the description of the embodiments herein or for the prior art will now be briefly described, it is evident that the accompanying drawings listed in the following description show merely some embodiments according to this disclosure, and that those having ordinary skill in the art will be able to obtain other drawings based on the arrangements shown in these drawings without making inventive efforts.

DETAILED DESCRIPTION

The technical solutions of the embodiments of the present disclosure will be clearly and completely described in the following with reference to the accompanying drawings. It is obvious that the embodiments to be described are only a part rather than all of the embodiments of the present disclosure. All other embodiments obtained by persons skilled in the art based on the embodiments of the present invention without creative efforts shall fall within the protection scope of the present invention.

It should be understood that the terms used in this specification and claims such as "comprising" and "including" refer to the existence of the described characteristics, steps, operations, elements and/or components, without excluding one or more other characteristics, steps, operations, elements and/or components, or the existence or addition of their sets.

It is also to be understood that, the terms described in the present disclosure are only for description of specific embodiment, rather than limiting the scope of the disclosure. As described in the specification and claims of the present disclosure, "a", "one" and "this" is used for description of subject including the plural form, unless other situation is clearly defined in the context.

It should also be understood that the terms "and/or" used in this specification and the claims of the present disclosure refer to any combination of one or more of the items listed in the relevant connection, as well as to all possible combinations, and include those combinations.

All directional indications in the present disclosure, e.g., "up", "down", "front", "back", "left", "right", "inside", "outside", "side surface", and so on, are only directions referred to the figures. Therefore, the directional indications are configured to explain and specific the present disclosure, and cannot be intended to limit the present application.

Figure 1:
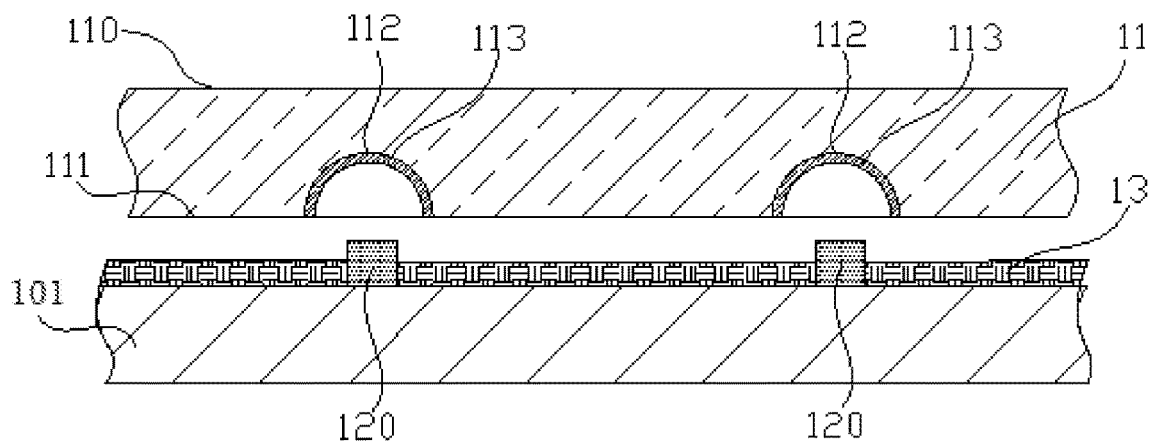
FIG. 1 is a structure diagram of the backlight module of the present disclosure according to an exemplary embodiment.
Figure 10:
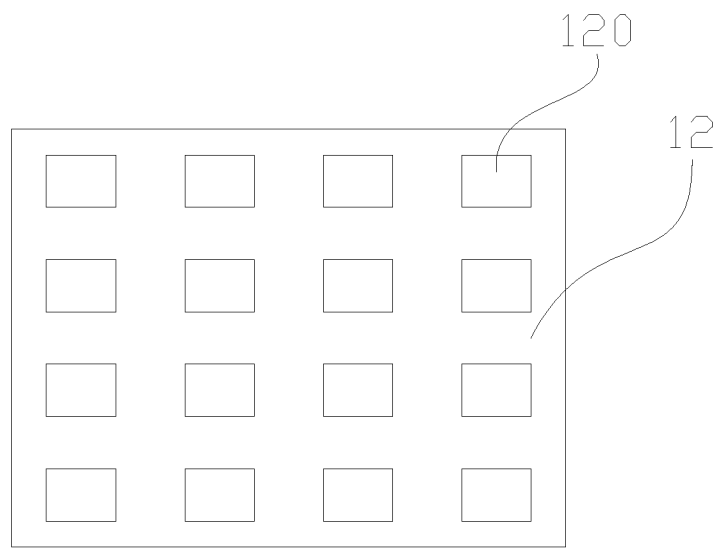
FIG. 10 is a diagram of the light source array of the backlight module in an exemplary embodiment of the present disclosure.

Referring to FIGS. 1 and 10, the first exemplary embodiment of the present disclosure provides a backlight module 10 which includes: a light source array 12 disposed on a backplane 101, and a diffusion plate 11 disposed above the light source array 12 and parallelled to the light source array 12. The light source array 12 includes a plurality of light source components 120; the portion of the diffusion plate 11 corresponding to each of the light source components 120 of the light source array 12 defines the refraction structure 112 configured to allow the emergent lights of the light source components 120 to refract.

In an exemplary embodiment, the backlight module 10 further includes an optical film provided on a light-emitting surface 110 of the diffusion plate 11, the optical film can allow the light from the diffusion plate 11 much more evenly, so as to improve user's visual experience.

In an exemplary embodiment, the refraction structure 112 is located on a light-incident surface 111 of the diffusion plate 11. The diffusion plate 11 can provide an uniform surface light source for the liquid crystal display panel. The diffusion plate 11 utilizes the physical phenomenon of refraction, reflection and scattering occurred when light encounters a medium with different refractive index through a chemical or physical mean, allowing the light to refract, reflect, and scatter towards different directions, so as to changing the path of light, therefore, the incident light can be sufficiently scattered to achieve the optical diffusion effect. Inorganic or organic light diffuser can be added into the diffusion plate 11, or the micro-structures of the substrate surface can be arranged in order, to artificially adjust the light. The refraction structure 112 provided on the light-incident surface 111 can allow the emergent lights of the light source components 120 to refract, as such the light can be much more evenly distributed in every position of the liquid crystal display panel, therefore improving the display effect of the liquid crystal panel.

In an exemplary embodiment, the light-emitting surface 110 of the diffusion plate 11 can be a flat surface. The diffusion plate 11 normally includes the light-incident surface 111 and the light-emitting surface 110, the lights from the light source components 120 move into the diffusion plate 11 through the light-incident surface 111 of the diffusion plate 11, and then emit out from the light-emitting surface 110 of the diffusion plate 11. the light-emitting surface 110 is a flat surface, for the light moving into the diffusion plate 11, a part of the light which is perpendicular to the light-emitting surface 110 can move out of the diffusion plate 11 without changing its direction, at the same time, the other part of the light which is not perpendicular to the light-emitting surface 110 and forms an angle with the light-emitting surface 110 can refract on the light-emitting surface 110, which contributes to improve the brightness display effect of the liquid crystal display panel, thereby solving the uneven brightness problem.

In some exemplary embodiments, the refraction structure 112 has a concave structure, the concave surface of the concave structure 112 is a smooth spherical surface, or a smooth ellipsoidal surface, however, it is not limited to this, the concave surface can also be a smooth conical surface, or polygonal conical surface. In an exemplary embodiment, the concave structure has the smooth spherical surface. The design of the concave structure having smooth spherical surface can receive the lights from the light source components 120 in a wider area, and allow the lights to refract and finally evenly emit out towards every direction, which can avoid the problem of the low brightness of a space between two light source components 120 due to the lack of light.

In an exemplary embodiment, each refraction structure 112 has a symmetrical structure, a symmetry axis of the at least one refraction structure 112 corresponding to one of the light source components 120 is consistent with a center axis of the one of the light source components 120. The refraction structures 112 based on the design can allow the lights which is emitted from the light source components 120 and perpendicular to the refraction structures 112 to emit without changing its direction, and can receive the lights from the light source components 120 in a wider area. The design of the symmetrical structure allows that the lights around the light source components 120 much uniform, which is benefit to improve the display effect of the liquid crystal display panel.

In an exemplary embodiment, a depositing layer 113 is formed on a surface of the concave structure. The depositing layer 113 can benefit the lights of the light source components 120 to refract towards every direction.

In an exemplary embodiment, the material of the depositing layer 113 includes polycarbonate, or polymethyl methacrylate. Polycarbonate is a high molecular polymer with its molecular chain containing polycarbonate, which not only has good chemical stability, but also has the properties of high transparent, heat resistance, wide service temperature, shock resistance, and high refractive index. The polymethyl methacrylate has the properties of high transparent, high visible light transmittance, excellent ageing resistance. The depositing layer 113 made of the polycarbonate, or polymethyl methacrylate has the advantages of high transparent and high refractive index, such the diffusion area of the lights from the light source components 120 diffusing around the light source can be enlarged, the brightness display effect of the liquid crystal display panel is greatly improved, so as to improve user's visual experience.

In an exemplary embodiment, a reflective layer 13 is provided on the surface of the backplane 101 having the light source array 12. when the lights from the light source components 120 arrive at the light-incident surface 111, a part of the lights bend, another part emit out without changing its direction, the other reflect. The reflected light can be regarded as a part of the light from the light source. When the reflective layer 13 is not designed on the backplane 101, the reflected light cannot be reused, causing that the use ratio of light source is low. In addition, as a part of the light reflects on the light-incident surface 111 of the diffusion plate 11, such the brightness of the light emitted from the diffusion plate 11 decreases, the display brightness of the liquid crystal display panel is reduced, and the user's visual experience is also affected. The design of the reflective layer 13 may further reflect the light, which is reflected from the diffusion plate 11, one or more times, to reflect the light to the light-incident surface 111, and finally the light emits out from the light-emitting surface 110 of the diffusion plate 11. This design can increase the use ratio of the light source, and the display brightness effect is also improved.

Figure 2:
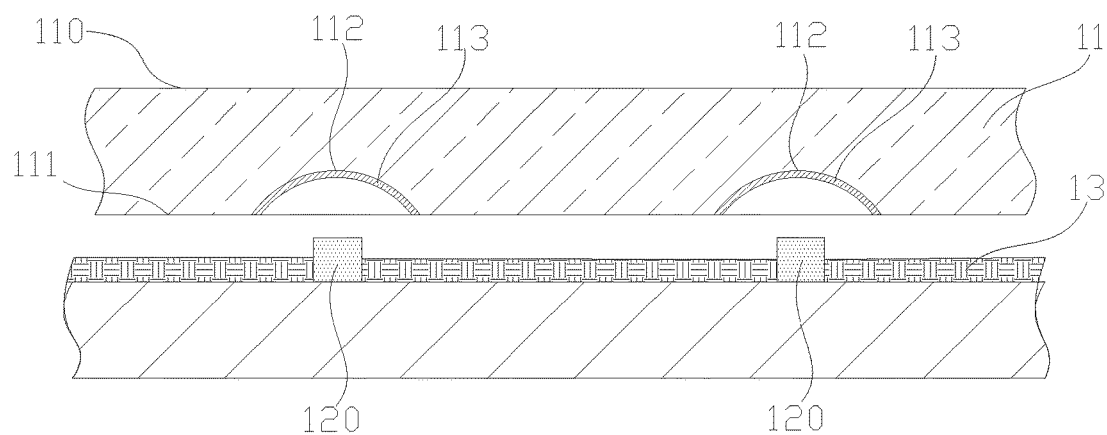
FIG. 2 is a structure diagram of the backlight module of the present disclosure according to another exemplary embodiment.

FIGS. 2 and 10 are diagrams of the backlight module and the light source array in the backlight module in another exemplary embodiment of the present disclosure. In the exemplary embodiment, the backlight module 10 includes: a light source array 12 disposed on a backplane 101, and a diffusion plate 11 disposed above the light source array 12 and parallelled to the light source array 12. The light source array 12 includes a plurality of light source components 120; the portion of the diffusion plate 11 corresponding to each of the light source components 120 of the light source array 12 defines the refraction structure 112 configured to allow the emergent lights of the light source components 120 to refract. The difference between the exemplary embodiment and the first exemplary embodiment is that: for the backlight module 10 of the exemplary embodiment, the refraction structure 112 on the diffusion plate 11 has a concave structure having a smooth ellipsoidal surface. The design of the concave structure having the smooth ellipsoidal surface allows the light to refract in all directions, which is benefit to solve the problem of uneven brightness which is occurred at the space between two light source components 120 and generated due to the lack of light, the display effect of the liquid crystal display panel is improved. The designs and descriptions in other aspect has been described in the foregoing exemplary embodiment, no need to repeat again.

Figure 3:
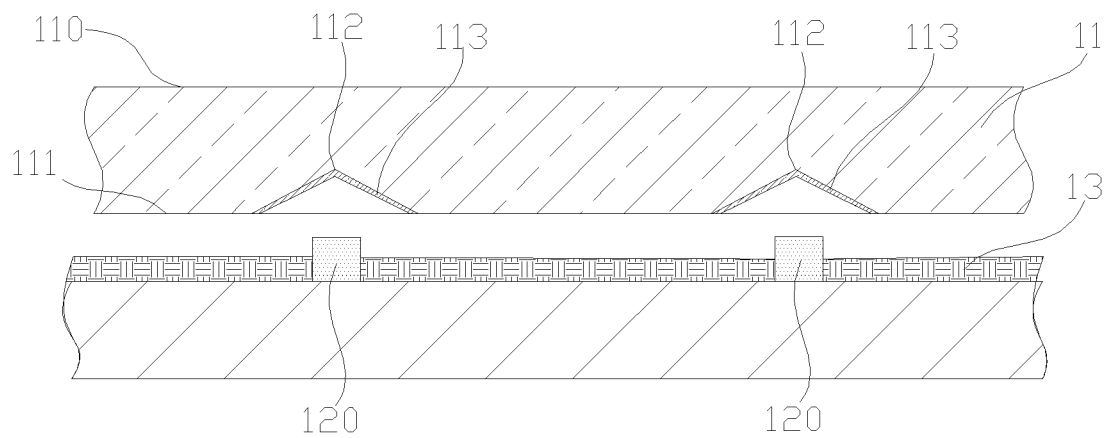
FIG. 3 is a structure diagram of the backlight module of the present disclosure according to a further exemplary embodiment.

FIGS. 3 and 10 show the backlight module of the present disclosure according to another exemplary embodiment, and the light source array in the backlight module. In the exemplary embodiment, the refraction structure 112 of the backlight module 10 in the exemplary embodiment has a smooth conical surface, an angle between a generatrix of the conical surface and a rotating axis of the conical surface is greater than 45 degrees. In detail, the backlight module 10 of the exemplary embodiment includes: a light source array 12 disposed on a backplane 101, a diffusion plate 11 disposed above the light source array 12 and parallelled to the light source array 12. The light source array 12 includes a plurality of light source components 120; the portion of the diffusion plate 11 corresponding to each of the light source components 120 of the light source array 12 defines the refraction structure 112 configured to allow the emergent lights of the light source components 120 to refract. The designs and descriptions in other aspect are described in the first exemplary embodiment, no need to repeat again.

Figure 4:
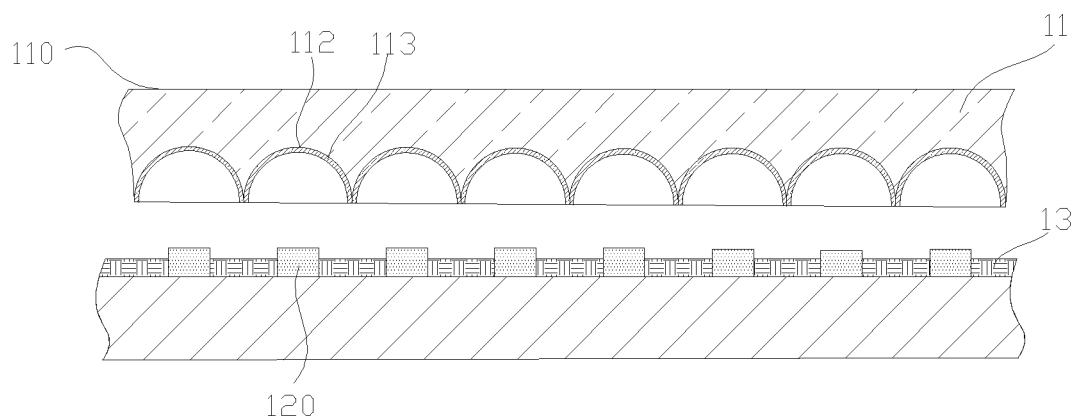
FIG. 4 is a structure diagram of the backlight module of the present disclosure according to a further exemplary embodiment.

FIGS. 4 and 10 show the backlight module of the present disclosure according to another exemplary embodiment, and the light source array in the backlight module. In the exemplary embodiment, the backlight module 10 of the exemplary embodiment includes: a light source array 12 disposed on a backplane 101, a diffusion plate 11 disposed above the light source array 12, the diffusion plate 11 is parallelled to the light source array 12. The light source array 12 includes a plurality of light source components 120. The portion of the diffusion plate 11 corresponding to each of the light source components 120 of the light source array 12 defines a refraction structure 112 configured to allow the emergent lights of the light source components 120 to refract. For the backlight module 10 of the exemplary embodiment, the light-incident surface of the diffusion plate 11 defines refraction structures 112 connected with each other, the refraction structure 112 has a smooth concave spherical surface, as such when the light source components 120 of the light source array 12 are large in quantity and densely arranged, the refraction structures 112 can play a role in refracting and diffusing the light to make the display brightness much more uniform and improve user's visual experience. The designs and descriptions in other aspect are described in the first exemplary embodiment, no need to repeat again.

Figure 5:
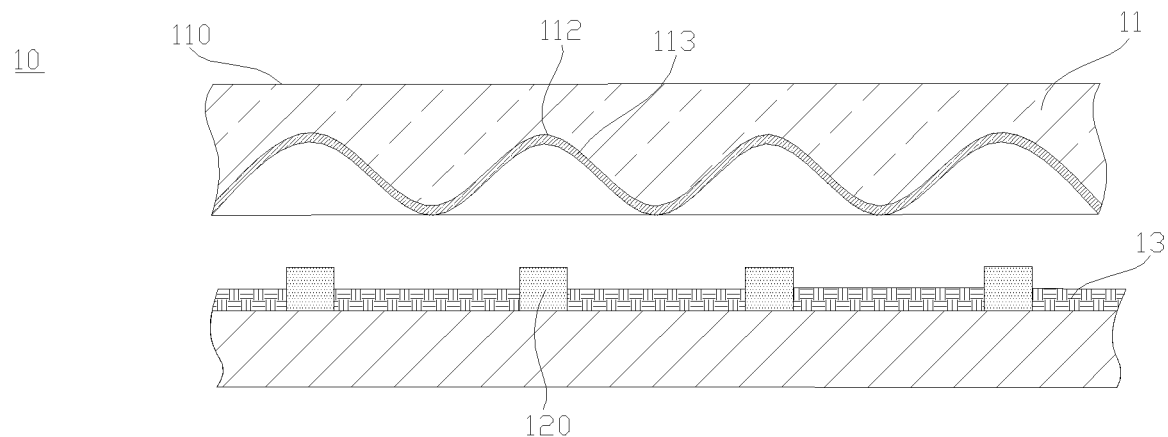
FIG. 5 is a structure diagram of the backlight module of the present disclosure according to a further exemplary embodiment.

FIGS. 5 and 10 show the backlight module of the present disclosure according to another exemplary embodiment, and the light source array in the backlight module. For the backlight module 10 of the exemplary embodiment, the diffusion plate 11 defines refraction structures 112 connected with each other, the refraction structure 112 has a smooth concave ellipsoidal surface. As such when the light sources are large in quantity and densely arranged with the dimension of the panel unchanged, the backlight module 10 of the exemplary embodiment can also allow the lights from the light source components 120 to refract in a large area, such the brightness of the space between the light source components 120 is almost the same as the brightness of the area at the vertical direction of the light source components 120, to further solve the problem of uneven brightness in the display panel. The designs and descriptions in other aspect are described in the first exemplary embodiment, no need to repeat again.

Figure 6:
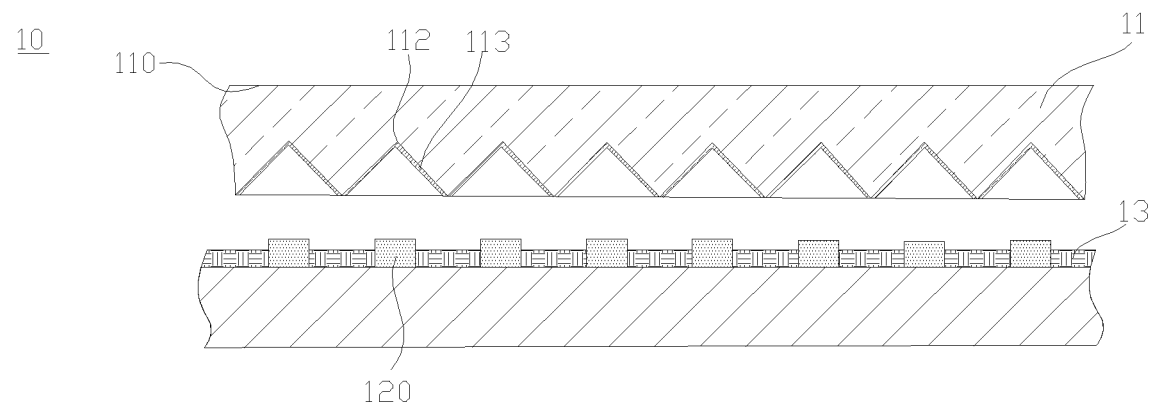
FIG. 6 is a structure diagram of the backlight module of the present disclosure according to a further exemplary embodiment.

FIGS. 6 and 10 show the backlight module of the present disclosure according to another exemplary embodiment, and the light source array in the backlight module. For the backlight module 10 of the exemplary embodiment, the diffusion plate 11 defines refraction structures 112 connected with each other, the refraction structure 112 has a smooth conical surface. The designs and descriptions in other aspect are described in the first exemplary embodiment, no need to repeat again.

Figure 7:
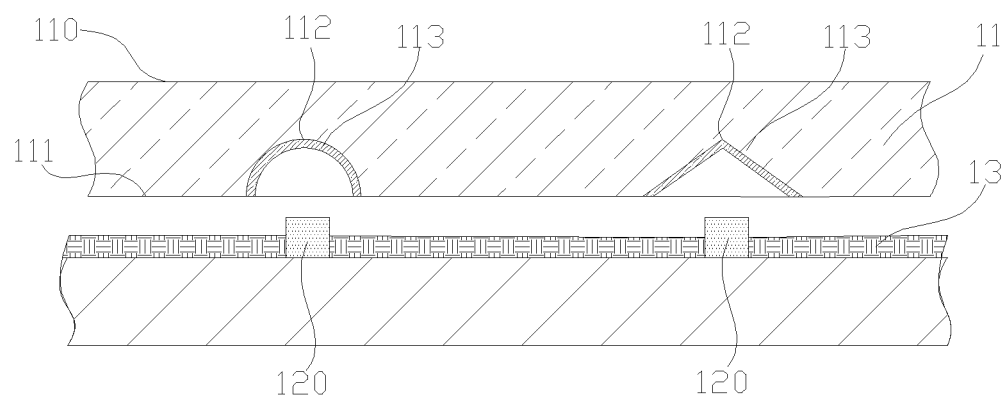
FIG. 7 is a structure diagram of the backlight module of the present disclosure according to a further exemplary embodiment.
Figure 8:
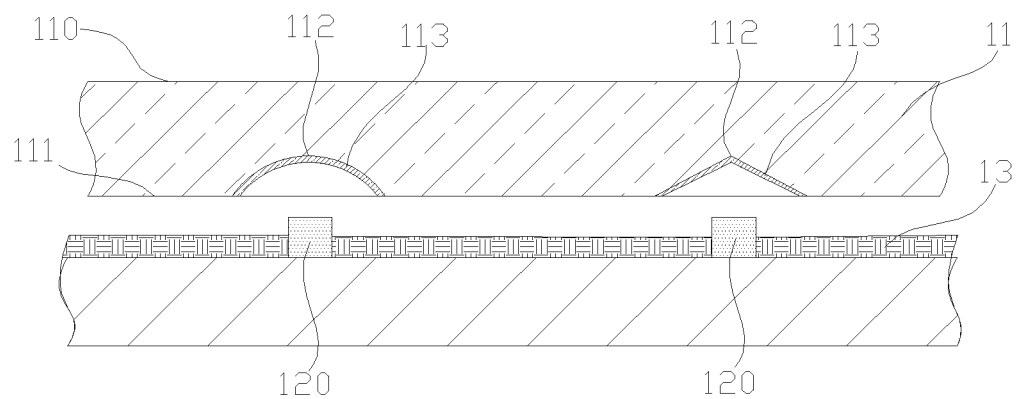
FIG. 8 is a structure diagram of the backlight module of the present disclosure according to a further exemplary embodiment.

In the backlight module 10, the refraction structures 112 on the diffusion plate 11 may have different shapes. Referring to FIG. 7, which shows the backlight module 10 according to a further exemplary embodiment of the present disclosure, the refraction structures 112 on the diffusion plate 11 of the backlight module 10 have the smooth spherical surface and the smooth conical surface. Referring to FIG. 8, which shows the backlight module 10 according to another exemplary embodiment of the present disclosure, the refraction structures 112 on the diffusion plate 11 of the backlight module 10 have the smooth ellipsoidal surface and the smooth conical surface.

Figure 9:
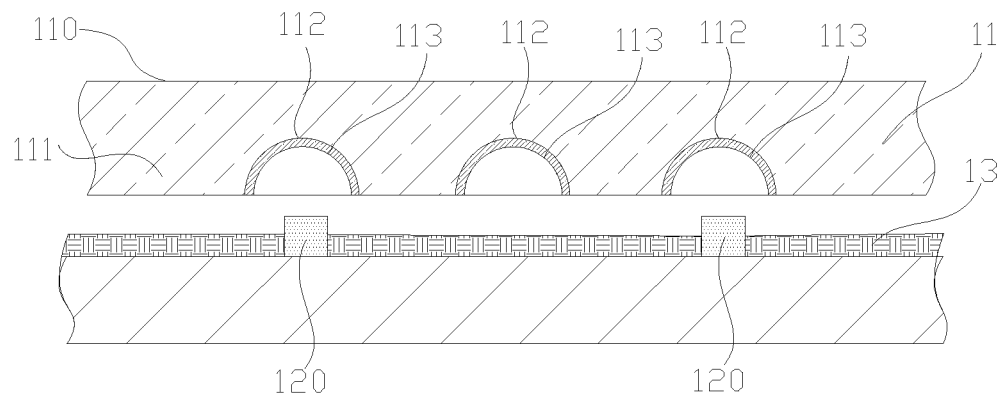
FIG. 9 is a structure diagram of the backlight module of the present disclosure according to a further exemplary embodiment.

FIGS. 9 and 10 show the backlight module 10 of the present disclosure according to a further exemplary embodiment, and the light source array 12 in the backlight module 10. For the backlight module 10 of the exemplary embodiment, the diffusion plate 11 defines refraction structures 112, the refraction structure 112 has a smooth concave spherical surface. The difference between the backlight module 10 of the exemplary embodiment and the backlight module 10 in FIG. 1 is that: a part of the refraction structures 112 correspond to the light source components 120 of the light source array 12, while the other part of the refraction structures 112 do not correspond to the light source components of the light source array 12. In the exemplary embodiment, one refraction structure 112 located in the refraction structures 112 respectively corresponding to the light source components 120 of the light source array 12 is configured to refract the light reflected from the reflective layer 13, to improve the display effect. In the exemplary embodiment, only the refraction structures of the backlight module 10 having the smooth concave spherical surfaces are shown, but it is not limited to this, the refraction structures 112 can also have the structure having the refracting function, such as, smooth concave ellipsoidal surface, smooth concave conical surface, smooth concave polygonal conical surface, etc. In addition, for the backlight module 10 shown in the exemplary embodiment, the diffusion plate 11 defines a plurality of refraction structures 112 spaced from each other, but the technical proposal is not limited to this, for example, the diffusion plate 11 defines the refraction structures 112 connected with each other, each of the refraction structure 112 can have the structure having the refracting function, such as, smooth concave spherical surface, smooth concave ellipsoidal surface, smooth concave conical surface, smooth concave polygonal conical surface, etc. There are one or more refraction structures 112, located in the refraction structures 112 corresponding to the light source components 120, which do not correspond to the light source components 120.

The light source of the light source array 12 in the backlight module 10 adopts the cold cathode fluorescent lamp and light emitting diode, etc. Electively, the light emitting diode can be used as the light source in the backlight module. The light emitting diode has the advantages of high luminance, low power supply, small volume, good stability, and low price.

Figure 11:
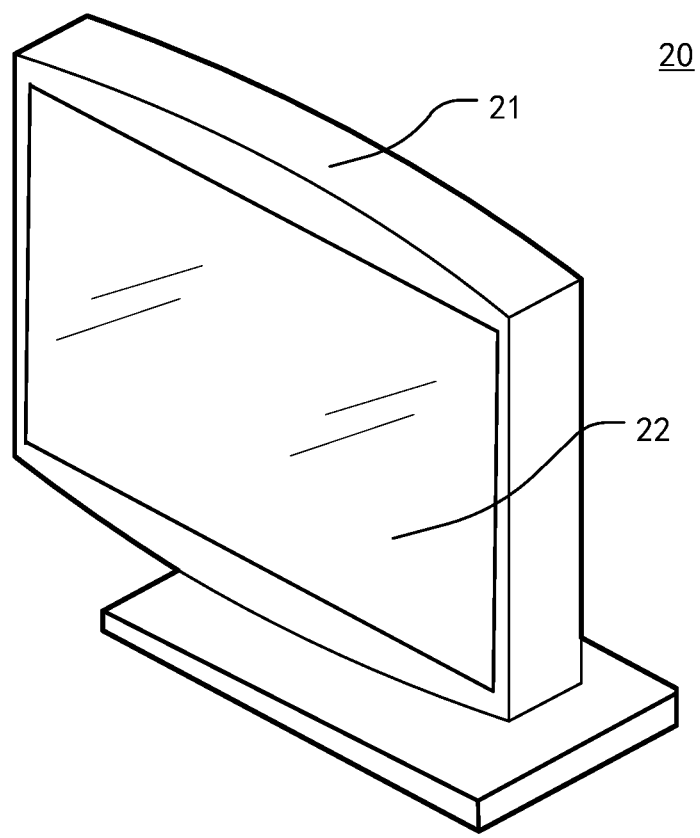
FIG. 11 is a structure diagram of the display device of the present disclosure according to an exemplary embodiment.

Referring to FIG. 11, the exemplary embodiment of the present disclosure further provides a display device 20, which includes a housing 21, a backlight module (not shown) disposed in the housing 21, and a display panel 22. The display panel 22 is located at the out-light side of the backlight module, the backlight module includes the foregoing backlight module 10 provided by the present disclosure. As the backlight module adopts the foregoing backlight module 10 provided by the present disclosure, the backlight module can well solve the uneven brightness problem caused by the reducing of the light sources in the current backlight module, for effectively improving the display effect of the display panel.

As mentioned above, for the backlight module provided by the exemplary embodiment of the present disclosure, the diffusion plate defines the refraction structure which can enable the lights of the light source components of the light source array to refract, therefore, the backlight module can well solve the uneven brightness problem caused by the reducing of the light sources in the current backlight module, for effectively improving the display effect of the display panel.

The foregoing descriptions are merely specific implementation manners of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A backlight module, comprising:
   a backplane;
   a light source array, disposed on the backplane and comprising a plurality of light source components;
   a diffusion plate, disposed above the light source array and parallelled to the light source array, the diffusion plate being provided with refraction structures, lights of the plurality of light source components being refracted by the refraction structures, at least part of the refraction structures corresponding to each of the plurality of light source components of the light source array, the refraction structures being successively connected end to end.

2. The backlight module according to claim 1, wherein, the refraction structures are provided on a light-incident surface of the diffusion plate, and the light-incident surface is disposed above the plurality of light source components.

3. The backlight module according to claim 2, wherein, a light-emitting surface of the diffusion plate is a flat surface.

4. The backlight module according to claim 3, wherein, each of the refraction structures has a concave structure, and a concave surface of the concave structure is a smooth spherical surface or a smooth ellipsoidal surface.

5. The backlight module according to claim 3, wherein, each of the refraction structures has a concave structure, a concave surface of the concave structure is a smooth conical surface, and an angle between a generatrix of the conical surface and a rotating axis of the conical surface is greater than 45 degrees.

6. The backlight module according to claim 3, wherein, each of the refraction structures has a symmetrical structure, and a symmetry axis of each of the refraction structures corresponding to one of the plurality of light source components is consistent with a center axis of the one of the plurality of light source components.

7. The backlight module according to claim 6, wherein, a depositing layer is formed on a surface of the concave structure.

8. The backlight module according to claim 7, wherein, a material of the depositing layer comprises polycarbonate, or polymethyl methacrylate.

9. The backlight module according to claim 1, wherein, a reflective layer is provided on a side of the backplane having the light source array.

10. A backlight module, comprising:
a backplane;
a light source array, disposed on the backplane and comprising a plurality of light source components, a reflective layer being provided on a surface of the backplane having the light source array; and
a diffusion plate, disposed above the light source array and parallelled to the light source array, the diffusion plate being provided with refraction structures successively connected end to end on a light-incident surface, lights of the plurality of light source components being refracted by the refraction structures, one of the refraction structures being a smooth spherical surface or a smooth ellipsoidal surface, at least part of the refraction structures corresponding to each of the plurality of light source components of the light source array.

11. A display device, comprising:
a backlight module; and
a display panel, disposed at a light-emitting side of the backlight module;
wherein, the backlight module comprises:
a backplane;
a light source array, disposed on the backplane and comprising a plurality of light source components;
a diffusion plate, disposed above the light source array and parallelled to the light source array, the diffusion plate being provided with refraction structures, lights of the plurality of light source components being refracted by the refraction structures, at least part of the refraction structures corresponding to each of the plurality of light source components of the light source array, the refraction structures being successively connected end to end.

12. The display device according to claim 11, wherein, the refraction structures are provided on a light-incident surface of the diffusion plate, and the light-incident surface is disposed above the plurality of light source components.

13. The display device according to claim 12, wherein, a light-emitting surface of the diffusion plate is a flat surface.

14. The display device according to claim 13, wherein, each of the refraction structures has a concave structure.

15. The display device according to claim 14, wherein, a concave surface of the concave structure is a smooth spherical surface or a smooth ellipsoidal surface.

16. The display device according to claim 14, wherein, each of the refraction structures has a symmetrical structure, and a symmetry axis of each of the refraction structures corresponding to one of the plurality of light source components is consistent with a center axis of the one of the plurality of light source components.

17. The display device according to claim 16, wherein, a depositing layer is formed on a surface of the concave structure.

18. The display device according to claim 17, wherein, a material of the depositing layer comprises polycarbonate, or polymethyl methacrylate.

19. The display device according to claim 11, wherein, a reflective layer is provided on a side of the backplane having the light source array.

* * * * *